United States Patent
Skärby

(10) Patent No.: US 8,228,840 B2
(45) Date of Patent: Jul. 24, 2012

(54) ANTENNA DIVERSITY ARRANGEMENT AND METHOD

(75) Inventor: Ulf Skärby, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1191 days.

(21) Appl. No.: 11/629,069

(22) PCT Filed: Jun. 15, 2004

(86) PCT No.: PCT/SE2004/000942
§ 371 (c)(1),
(2), (4) Date: Dec. 12, 2007

(87) PCT Pub. No.: WO2005/125045
PCT Pub. Date: Dec. 29, 2005

(65) Prior Publication Data
US 2008/0119197 A1    May 22, 2008

(51) Int. Cl.
*H04W 4/00* (2009.01)
(52) U.S. Cl. .................................................... 370/328
(58) Field of Classification Search .................. 370/342, 370/343, 344, 328
See application file for complete search history.

(56) References Cited

U.S. PATENT DOCUMENTS

| | | | |
|---|---|---|---|
| 4,563,774 | A | 1/1986 | Gloge |
| 4,649,549 | A | 3/1987 | Halpern et al. |
| 4,748,682 | A | 5/1988 | Fukae et al. |
| 5,067,173 | A | 11/1991 | Gordon et al. |
| 5,216,434 | A | 6/1993 | Fukumura |
| 5,248,988 | A | 9/1993 | Makino |

(Continued)

FOREIGN PATENT DOCUMENTS
EP    0 684 707    11/1995
(Continued)

OTHER PUBLICATIONS

International Search Report for PCT/SE2004/000942 mailed Feb. 2, 2005.

(Continued)

*Primary Examiner* — Derrick Ferris
*Assistant Examiner* — Mohammad Anwar
(74) *Attorney, Agent, or Firm* — Nixon & Vanderhye P.C.

(57) ABSTRACT

An antenna diversity arrangement and a radio base station in a frequency divided mobile cellular system with sectorized cells are described. Space diversity or polarization diversity is provided by providing at least two branches. In accordance with the invention an operator frequency band is divided into a plurality of bands for transmitting and receiving. All sectors are branch wise combined in a respective tower mounted amplifier. TX signals within the TX bands belonging to a TMA are diplexed and simultaneously transmitted on the sectors. RF signals received on one branch of a sector are combined with RF signals received on the corresponding sector in the other branches. The RX signals so combined are fed to the radio base station on a single feeder together with the TX signals fed in the opposite direction from transceivers of the base station to the same TMA. A sector may be assigned two or more TX frequencies. Frequency hopping within each TX band may optionally be provided (synth hopping). If two or more TX frequencies are assigned to a sector synth hopping may be combined with frequency hopping between the TX bands assigned to the sector in the A branch as well as the TX bands assigned to the corresponding sector in the B branch.

19 Claims, 12 Drawing Sheets

U.S. PATENT DOCUMENTS

| | | | |
|---|---|---|---|
| 5,280,472 | A | 1/1994 | Gilhousen et al. |
| 5,408,495 | A * | 4/1995 | Kotzin et al. ............... 375/135 |
| 5,444,745 | A | 8/1995 | Ali-Vehmas |
| 5,483,667 | A * | 1/1996 | Faruque .................. 455/447 |
| 5,513,176 | A | 4/1996 | Dean et al. |
| 5,533,011 | A | 7/1996 | Dean et al. |
| 5,742,583 | A | 4/1998 | Scott |
| 5,844,632 | A | 12/1998 | Kishigami et al. |
| 5,859,842 | A | 1/1999 | Scott |
| 5,926,503 | A | 7/1999 | Kelton et al. |
| 5,963,874 | A | 10/1999 | Mahler |
| 6,047,199 | A | 4/2000 | Demarco |
| 6,049,310 | A | 4/2000 | Sadahiro |
| 6,104,356 | A | 8/2000 | Hikuma et al. |
| 6,252,507 | B1 | 6/2001 | Gagnon |
| 6,339,703 | B1 | 1/2002 | Otsuka |
| 6,522,307 | B2 | 2/2003 | Kim |
| 6,522,642 | B1 | 2/2003 | Scott |
| 6,557,879 | B2 * | 5/2003 | Caldwell .................. 280/242.1 |
| 6,571,110 | B1 | 5/2003 | Patton et al. |
| 6,621,469 | B2 | 9/2003 | Judd et al. |
| 6,640,111 | B1 * | 10/2003 | Shapira .................. 455/562.1 |
| 6,868,254 | B2 | 3/2005 | Weissman |
| 6,870,515 | B2 | 3/2005 | Kitchener et al. |
| 7,054,397 | B1 | 5/2006 | Kawanabe |
| 7,069,053 | B2 | 6/2006 | Johannisson et al. |
| 7,123,939 | B1 | 10/2006 | Bird et al. |
| 7,181,243 | B1 | 2/2007 | Nicholis et al. |
| 7,257,369 | B2 | 8/2007 | Weissman |
| 7,272,417 | B2 | 9/2007 | Mostafa et al. |
| 2001/0044323 | A1 | 11/2001 | Waylett |
| 2002/0009982 | A1 | 1/2002 | Kim |
| 2002/0016152 | A1 | 2/2002 | Weissman et al. |
| 2003/0139198 | A1 | 7/2003 | Johannisson et al. |
| 2004/0125741 | A1 | 7/2004 | Demoulin et al. |
| 2004/0214608 | A1 | 10/2004 | Mostafa et al. |
| 2005/0215288 | A1 | 9/2005 | Beaudin et al. |
| 2005/0277387 | A1 | 12/2005 | Kojima et al. |
| 2006/0003808 | A1 | 1/2006 | Haskell et al. |
| 2006/0111041 | A1 | 5/2006 | Karabinis |
| 2007/0058761 | A1 | 3/2007 | Lindenmeier |
| 2007/0135169 | A1 | 6/2007 | Sychaleun et al. |
| 2007/0173288 | A1 | 7/2007 | Skarby et al. |
| 2008/0026796 | A1 | 1/2008 | Thomas |
| 2008/0119197 | A1 | 5/2008 | Skarby |
| 2008/0287163 | A1 | 11/2008 | Skarby et al. |

FOREIGN PATENT DOCUMENTS

| | | |
|---|---|---|
| EP | 1 100 212 | 5/2001 |
| EP | 1191700 A1 * | 3/2002 |
| JP | 02-260925 | 10/1990 |
| JP | 06-077865 | 3/1994 |
| JP | 07-336294 | 12/1995 |
| JP | 08-046541 | 2/1996 |
| JP | 11-122131 | 4/1999 |
| JP | 11-298944 | 10/1999 |
| JP | 2001-069025 | 3/2001 |
| JP | 2003-513569 | 4/2003 |
| JP | 2003-274296 | 9/2003 |
| WO | 99/26317 | 5/1999 |
| WO | WO 01/33876 | 5/2001 |

OTHER PUBLICATIONS

Summary of Japanese official action, Nov. 13, 2009, in corresponding Japanese Application No. 2007-516420.

U.S. Appl. No. 10/598,678, filed Sep. 6, 2006; Inventor: Skarby et al.

Office Action mailed Nov. 14, 2007 in co-pending U.S. Appl. No. 10/598,678.

Office Action mailed May 12, 2009 in co-pending U.S. Appl. No. 10/598,678.

Office Action mailed Sep. 29, 2009 in co-pending U.S. Appl. No. 10/598,678.

Office Action mailed Jul. 7, 2010 in co-pending U.S. Appl. No. 10/598,678.

Swedish Patent Office, International Search Report for PCT/SE2004/000359, dated Sep. 30, 2004.

International Preliminary Report on Patentability for PCT/SE2004/000359, dated Mar. 1, 2006.

Translation of Chinese Official Action, Dec. 11, 2009, in corresponding Chinese application No. 2004-80042369.

Translation of Japanese Official Action, Oct. 2, 2009, in corresponding Japanese Application No. JP 2007-502751.

Office Action mailed Jan. 19, 2011 in co-pending U.S. Appl. No. 10/598,678.

Canadian official action, May 18, 2011, in corresponding Canadian Application No. 2,570,166.

English Translation of Chinese official action, Jun. 2, 2011, in Chinese Application No. 200480043817.1.

* cited by examiner

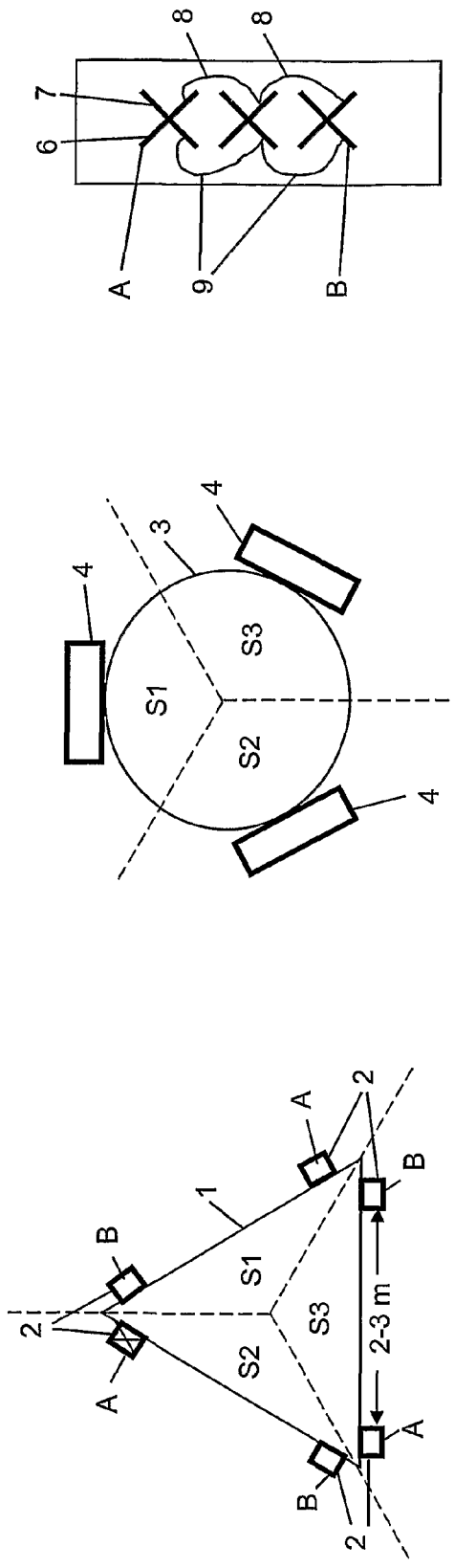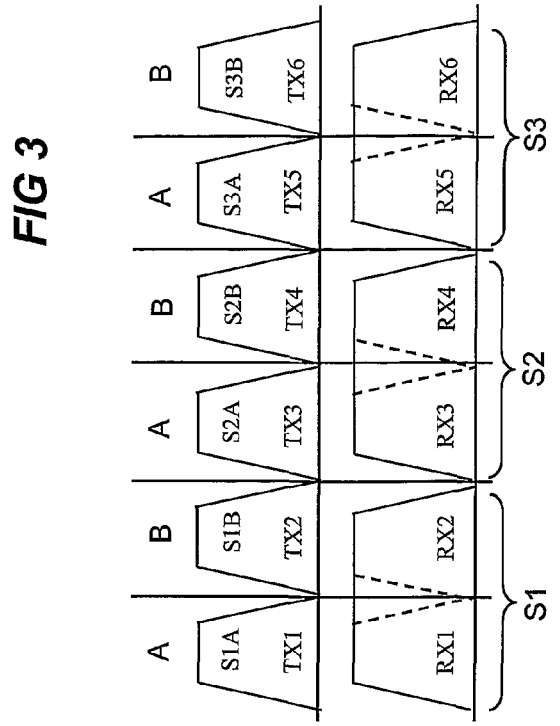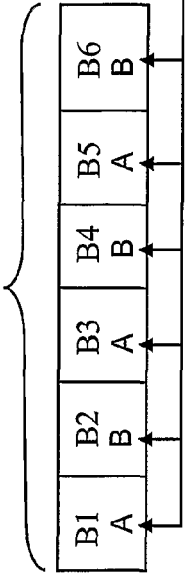

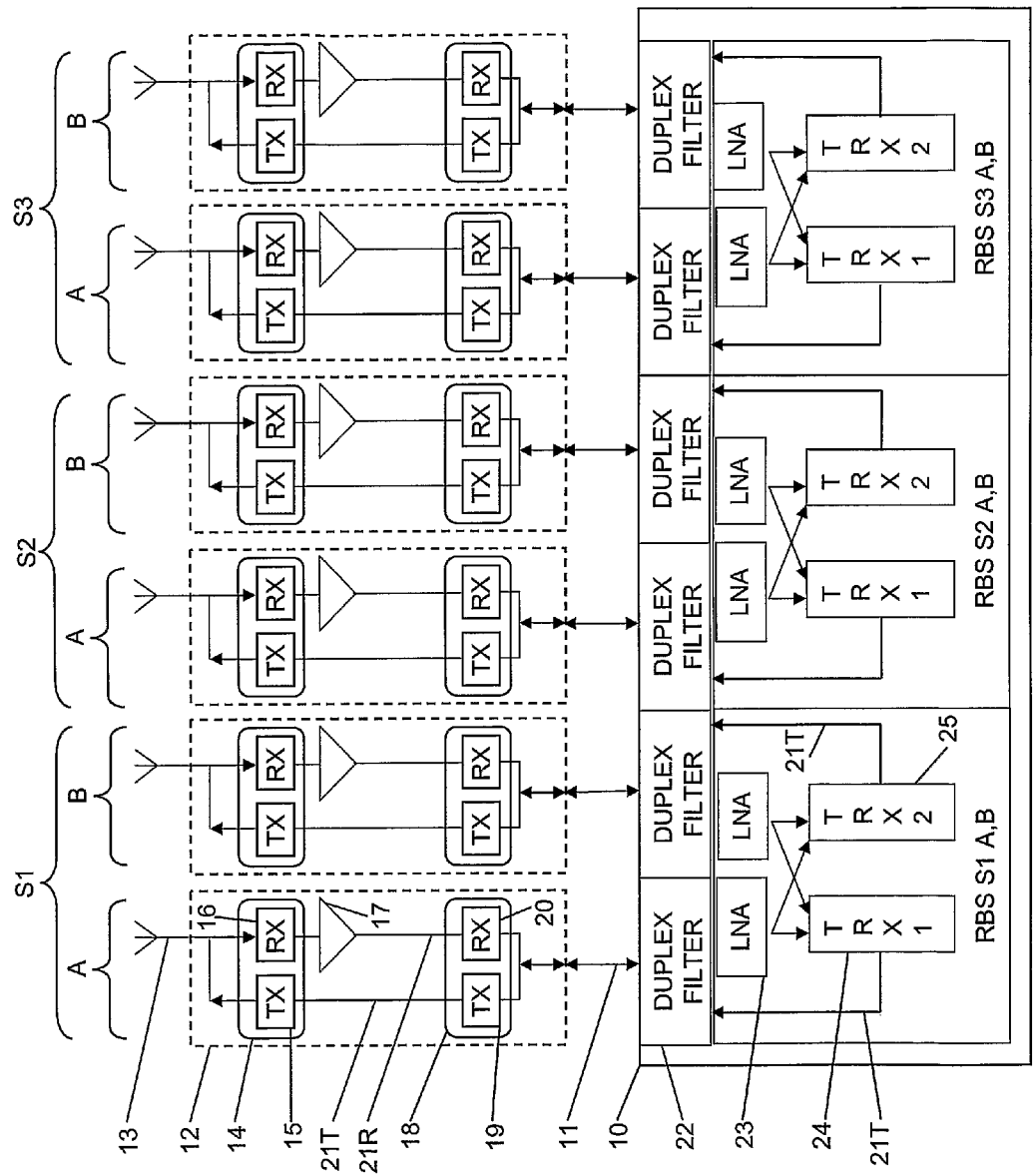

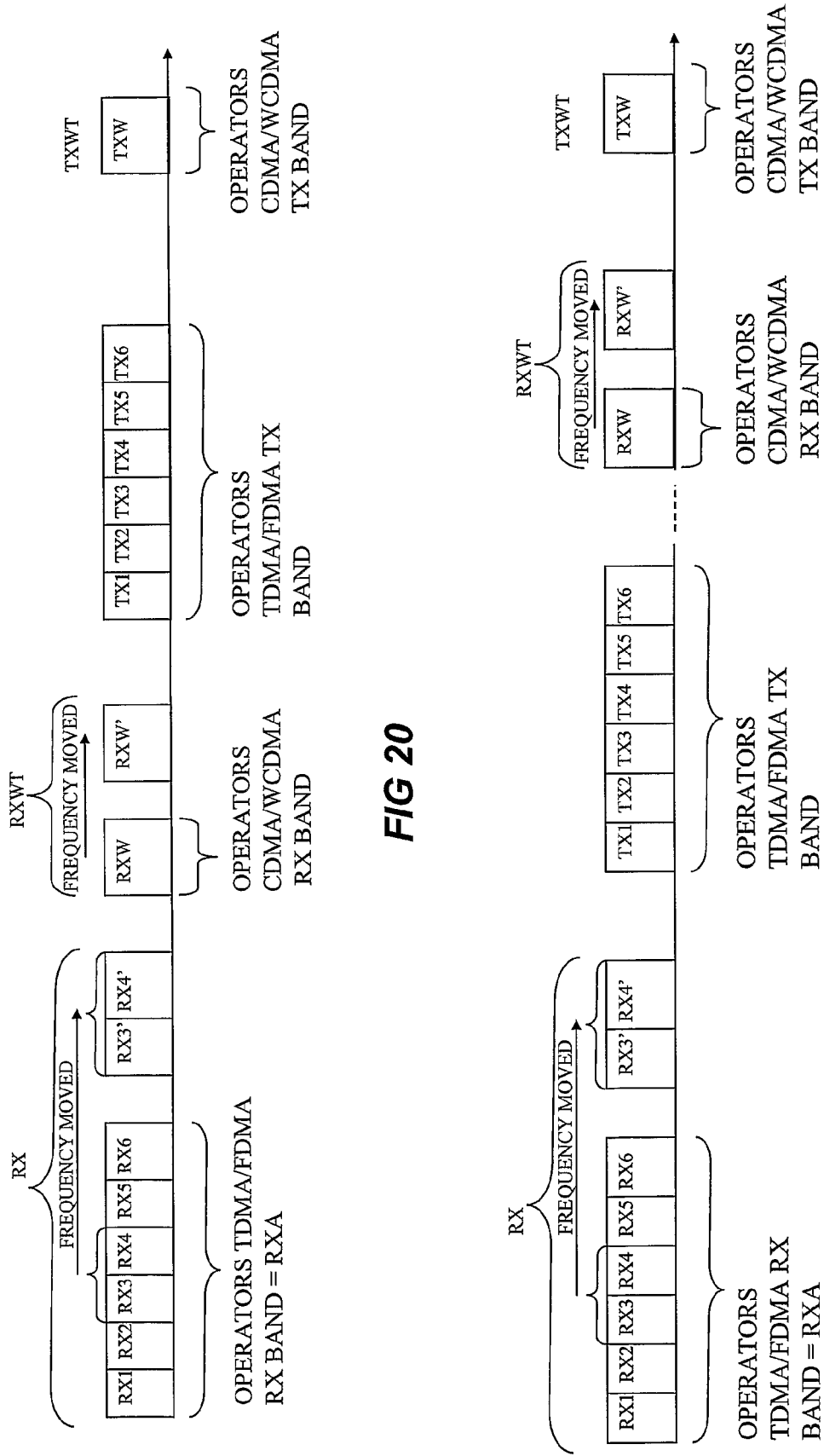

ANTENNA DIVERSITY ARRANGEMENT AND METHOD

This application is the US national phase of international application PCT/SE2004/000942 filed 15 Jun. 2004, which designated the U.S., the entire content of which is hereby incorporated by reference.

TECHNICAL FIELD

The invention relates in general to the telecommunication field and, in particular, to an antenna diversity arrangement.

BACKGROUND

It is well known to use diversity reception techniques in order to reduce the effects of fading. Space-diversity and polarization diversity techniques are known.

In FIG. 1 a typical antenna arrangement for providing space diversity is shown to comprise a tower 1 with triangular cross section. At each side of the tower and in the top thereof two spaced apart antennas 2 are mounted. Signals received at one of these are fed along a branch A to a first non-shown receiver and signals received at the other of these are fed along a branch B to a second non-shown receiver. The received radio signal in branch A is compared with the one received in branch B and the strongest one is selected or are the signals received in the branches combined in the base band. In a typical mobile radio system the two antennas are spaced at least 10 wavelengths meters apart.

In FIG. 1 the antenna arrangement provides sectorized cells in a cellular mobile radio system by the provision of the two antennas 2 at each side of the tower. The sectors are indicated with dashed lines and are labelled S1, S2 and S3.

In FIG. 2 a typical antenna arrangement providing polarization diversity is shown. At the top of a tower, a pole 2 or at any similar support three antennas 4 are mounted 120 degrees angularly displaced thus providing three sectors S1-S3 as shown with dashed lines. A front view of each antenna 4 is shown in FIG. 3. As appears therein each antenna comprises three vertically spaced apart antenna elements with orthogonal polarization. Each antenna element comprises two cross-laid elements 6 and 7. Elements 6 of the antennas are interconnected with schematically shown cables 8. Likewise elements 7 are interconnected with cables 9. The interconnected elements 6 together form a branch A for RF signals. The interconnected elements 7 form a branch B for RF radio signals. If a radio source, for example a mobile unit, is transmitting its RF signals will be received in branch A and branch B at the same time. Down in the radio base station the received RF signals are combined in the base band. A diversity gain is attained in environments with a high proportion of multi path signals. Because the antennas 4 do not need to be horizontally spaced apart they can be mounted under the same radome. The polarization antenna diversity arrangement requires less space than a space diversity antenna arrangement.

In the following antenna arrangements having three sectors and two branches A and B will be described, although the technology described in this application is not restricted to this. The technology described in this application may be applied to antenna arrangements using two or more sectors and two or more branches.

A typical RBS site is shown in FIG. 4. It comprises a radio base station (RBS) 10, six feeders 11 extending between the RBS and six tower mounted units (TMA) 12 each provided with a respective diversity antenna 13.

A TMA is sometimes called a mast head amplifier. It should be noted that these units need not be mounted in a tower, but may be mounted on poles, walls of buildings, building roofs etc. The same goes for the diversity antennas. The technology described in this application is therefore not restricted to amplifiers mounted in towers. A tower mounted amplifier is just a name under which a device of this kind is known to a person skilled in the art.

The antenna arrangement is similar to the one shown in FIGS. 1 and 2 and comprises three sectors S1-S3. In each sector there are two branches A and B providing diversity. The antenna arrangement is illustrated at the brackets labelled S1-S3 and A, B. Antenna 13 in sector S2 branch A would for example correspond to the cross marked antenna 2 in FIG. 1 or to branch A of antenna 4 in sector S2 in FIG. 2.

In FIG. 4 the TMAs are all identical and in the following reference is therefore only made to TMA 12 in branch A of sector S1. The antenna 13 is connected to a duplex filter 14 comprising a transmitter part (TX) 15 and a receiver part (RX) 16. An RF amplifier 17 amplifies the received filtered RX signal and supplies it to another duplex filter 18 which comprises a transmitter part (TX) 19 and a receiver part (RX) 20. The function of a duplex filter is to separate the TX signal from the RX signal allowing for amplification of the separated RX signal before it is applied to the feeder 11. Signals received on the two diversity antennas 13 of branches A and B in sector S1 are processed in a respective TMA.

The radio base station 10 comprises six duplex filters 22 each connected to a respective low noise amplifiers (LNA) 23, one for each antenna/TMA. The heart of the radio base station is the transceiver units 24, 25 (TRX1, TRX2) in which the RX signals are amplified, demodulated and diversity processed and forwarded to its destinations. Each TRX1 and TRX2 also provides TX signals which are forwarded over a respective feeder 11 to the TMA in branch A and to the TMA in branch B respectively. Each antenna 13 can transmit TX signals in the down link and can receive RX signals in the uplink.

RX signals will follow an RX chain 21R extending from the antenna 13, the RX part 16 of duplex filter 14, RF amplifier 17, the RX part 20 of duplex filter 18, feeder 11, duplex filter 22, LNA 23 to an TRX. TX signals will follow a TX chain 21T from a TRX, duplex filter 22, feeder 11, duplex filters 19 and 15, to antenna 13.

Depending on the capabilities a transceiver has and the traffic capacity a radio base station is designed for, there may be just one TRX or many more transceivers than the six shown.

The arrangement shown in FIG. 1 is called 2 way diversity with 6 feeders and three sectors.

A main drawback with the known RBS is that each TMA requires an individual feeder. For a three sector site with space or polarization diversity six feeders are required. Feeders are expensive and contribute to the costs of a site. Feeders are also relatively heavy and need to be individually clamped to the mast or tower. Each feeder will thus put a load on the tower, especially if the distance between the RBS and the TMA is long. Each feeder must also be manually clamped to the tower, a time consuming work, especially if there are many feeders that need to be clamped.

EP-A1-1100212 relates to a transmitter and receiver arrangement in which signals transmitted by four transmitters at four different frequencies are combined in hybrid combiners and broadband combiners. The four different signal frequencies are fed on a common feeder to a first terminal of a diplexer and are transmitted on a single antenna common to the four transmitters. The antenna also receives radio signals on a different RX frequency band. The diplexer provides the RX signals on a second terminal from which they are fed to a receiver on a second feeder. Accordingly there are two feeders between the diplexer and the transmitter and receiver arrangement. The TX frequencies fall within a TX frequency range which is generally non-overlapping the RX frequency range.

SUMMARY

An object is to reduce the number of feeders between a base station and a diversity antenna arrangement which provides sectorized cells in a cellular mobile telephone system.

An operator's frequency band is divided into a plurality of sub bands for transmitting and receiving (TX bands and RX bands). Each sector is assigned at least one TX band and one RX band. The assigned TX bands can be further divided into one or more TX sub-bands when diversity is used. Sectors are branch wise combined in a respective tower mounted amplifier (TMA). TX signals within the TX bands belonging to a TMA are diplexed and simultaneously transmitted on the sectors of this TMA. RF signals received on one branch of a sector are combined with RF signals received on the other sectors of the same branch. The RX signals so combined are fed to the radio base station on a single feeder together with the TX signals fed in the opposite direction from transceivers (TRX) of the base station to the same TMA.

A sector may be assigned two or more TX frequencies.

Frequency hopping within each assigned TX band may optionally be provided (synth hopping). Synth hopping may optionally be combined with base band hopping between the TX bands assigned to a sector in one branch and also between these TX bands and the TX bands assigned to the corresponding sector in other branches.

BRIEF DESCRIPTION OF THE DRAWINGS

FIG. 1 is a top plane view of a tower provided with an antenna arrangement allowing for space diversity, FIG. 2 is a top plane view of a tower provided with an antenna arrangement allowing for polarization diversity, FIG. 3 is a schematic front view of an antenna shown in FIG. 2, FIG. 4 is a block diagram of a radio base station site in accordance with prior art, FIG. 5 illustrates TX and RX bands assigned an operator and the process of assigning these to different sectors and branches of an antenna arrangement of the type shown in FIG. 1 or FIG. 2, the assignment process being used for a radio base station site of the kind shown in FIG. 6.

FIG. 20 is a frequency diagram illustrating a single frequency band divided between two operators whose operator bands are interleaved, FIG. 21 is a frequency diagram illustrating two different frequency bands divided between two operators.

DETAILED DESCRIPTION

In FIG. 5 the frequency band a federal authority assigns to an operator of a mobile radio system is divided into a plurality of sub bands B1-B6 for use as TX and RX frequency bands in the mobile radio system.

Suppose for example an operator has been assigned a frequency range of 12 MHz. Each of the B1-B6 bands will thus be 2 MHz wide. Within 2 MHz there may be 10 GSM carriers, each one of which is 200 kHz wide.

At first TX bands are assigned branches A and B in an alternating fashion as appears in the left hand section of FIG. 5. Thereafter pairs of A and B branches are distributed among sectors. The A and B branches in B1 and B2 are assigned sector S1, the A and B branches in B3 and B4 are assigned S2 and the A and B branches in B5 and B6 are assigned sector S3 in the antenna arrangement shown in FIG. 1 or FIGS. 2 and 3. This branch and sector assignment process of the TX bands results in a TX band distribution of the kind shown in the upper part of the right hand portion of FIG. 5. TX1 is assigned to branch A in sector S1, TX2 is assigned to branch B in the same sector S1, TX3 is assigned to branch A in sector S2, TX4 is assigned to branch B in S2 etc. It should be understood that the TX1 band lies within the B1 sub band, that TX2 lies within sub band B2 etc.

In each sector transmission will thus take place on two different TX bands. Using a diplexing technique to be described one of these will be transmitted on branch A while the other TX band will be transmitted on branch B.

Next RX frequencies are assigned to branches and sectors. As is well known in a mobile radio system a TX band is generally associated with a RX band. FIG. 5 illustrates the RX bands RX1-RX6 associated with the TX bands TX1-TX6. For example, in sector S1 branch A, on which transmission takes place on the TX1 band, radio signals are received on the RX1 band. The same goes for the other TX bands TX2-TX6 and its associated RX bands RX2-RX6.

In order to make diversity possible in a sector the sector's branches must all receive the same signal. Therefore it is necessary that branch A of sector S1 also receives the signals on the RX2 band in the other branch B. Branch A in S1 must therefore receive signals on the bands RX1+RX2. The same reasoning applies for branch B of sector SI on which transmission takes place on TX band TX2. Further to receiving signals on its associated RX band RX2 branch B must receive the signals on the A branch and therefore the B branch must receive on RX1+Rx2. This has been illustrated at the bottom part of the right portion of FIG. 5 where the individual RX bands are shown with dashed lines and the combined RX1+ RX2 band is shown with a solid lie. Applying the same reasoning for sector S2 it's A and B branches must receive on the combined RX3+RX4 band and in sector S3 its branches must receive radio signals falling within the combined RX band RX5+RX6.

Figure 6:
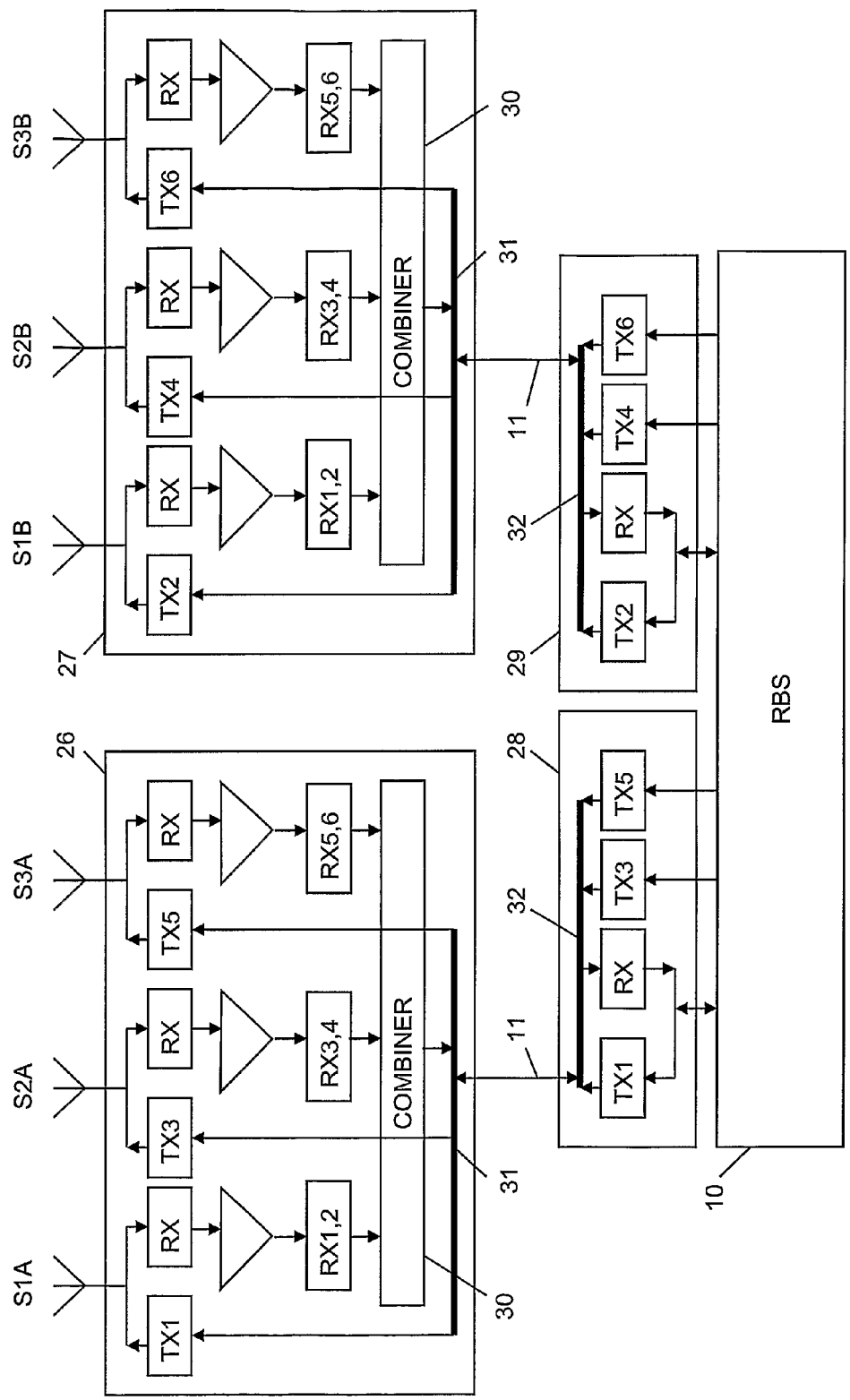
FIG. 6 is a block diagram of a radio base station site in accordance with a first non-limiting, example embodiment.

In FIG. 6 a first embodiment of a radio base station site is shown wherein the just discussed assignment procedure has been implemented. It should be understood that used legends, such as S1-S3, TX1-TX6, RX1-6, and A, B refer to the same objects discussed above in connection with FIG. 5. In FIG. 6 the notation, for example, S3A means sector S3 branch A. The site comprises two TMAs 26, 27, two feeders 11, two filter units 28, 29 and a RBS 10. The site to be described is a 3 sector site with 2 feeders. TMA 26 comprises the A branch of the antenna arrangement and TMA 27 comprises the B branch. TMA 26 is connected to a single feeder 11 which in its turn is connected to the filter unit 28. TMA 27 is connected to a single feeder 11 which in its turn is connected to the filter unit 29 provided in or outside the RBS 10. Filter unit 28 comprises three band pass filters TX1, TX3 and TX5 and a full band RX filter arranged in the manner shown.

Filter unit 29 comprises three band pass filters TX2, TX4 and TX6 and a full band RX filter arranged in the manner shown. Non-shown transceivers (TRX) in the RBS have been assigned a respective TX band within which the transmitter can transmit.

TMA 26 in FIG. 6 can be thought of as if the TMAs 12 in FIG. 4 below the brackets S1 and A; S2 and A and; S3 and A were combined into a single unit. In doing so it is assumed the respective sector and branches have been assigned the TX and RX bands as shown in the right hand portion of FIG. 5. To take the A-branches of all the sectors and combine them in a single TMA 26 is a novel feature which makes it possible to use only one feeder for the TMA. In similar manner the B-branches of all sectors are combined in a single TMA 27 with only one feeder.

In particular TMA 26 comprises a duplex filter made up of a band pass filter for the transmitter band TX1 and an RX filter connected to sector S1, branch A of the antenna arrangement. The RX filter, which passes at least the operator's band, is connected to the input of an RF amplifier the output of which is connected to an RX filter which passes the combined RX1+ RX2 frequency band shown in FIG. 5. The RX1+RX2 filter is connected to one input terminal of a combiner 30. The combiner is a hybrid type combiner with an attenuation of about 3 dB. The combiner has an output connected to a rail 31 connected to the feeder 11. In similar manner sector S2 branch A comprises a duplex filter with filters TX3 and RX, an RF amplifier and a combined RX3+RX4 filter. The RX3+RX4 filter is connected to the combiner. In similar manner sector S3 branch A comprises a duplex filter with filters TX5 and RX, an RF amplifier and a combined RX5+RX6 filter. The RX5+RX6 filter is connected to the combiner. In the combiner the received filtered signals on the A branches are combined and the combined signal is applied to the rail 31 from which it enters the feeder 11.

The filter unit 28 comprises a duplex filter TX1 and RX similar to duplex filter 22 in FIG. 4. The RX filter passes at least the RX1, RX2 . . . to RX6 frequencies and forwards the combined received signal to the transceivers in the RBS 10 in which it is subjected to diversity processing by comparison with a similarly combined signal and RX1+RX2 filtered received from TMA 27.

The filter unit 28 further comprises TX filters TX3 and TX5 each connected to a respective TRX in the RBS. The filters TX1, TX3 and TX5 are all connected to a rail 32 which is connected to the feeder 11. The individual TX signals passed by TX1, TX3 and TX5 respectively in filter 28 are simultaneously fed to the TMA 26 in the feeder 11 where they meet the rail 31 which splits the TX signals and sends them to the TX filters TX1, TX3 and TX5 at which they are filtered so that the transmitter signal within band TX1 is transmitted in branch A of S1, the transmitter signal within band TX3 is transmitted in branch A of S2 and the transmitter signal within band TX5 is transmitted in branch A of S2. The rail 31 has dual functions, it works as a splitter for TX signals and as a combiner for RX signals. The rail 32 has also dual functions, it works as a combiner for TX signals and as a splitter for RX signals.

The filter unit 29 has a structure identical to filter unit 28, although the filter units are designed for different TX and RX bands as indicated.

The main advantage with this embodiment is that only two feeders are needed, which should be compared with the 6 feeders needed according to the prior art shown in FIG. 4.

It should be noted that a transmitter frequency can be subjected to frequency hopping within the frequency band. For example a TX signal falling within the band TX1 may hop within the frequency band passed by the TX1 filter. The means by which this is achieved will be described further down.

A further advantage with the embodiment in FIGS. 5 and 6 is the following: The transmitters in the RBS are subject to the requirement that sectors must be mutually insulated. To comply with this requirement a guard band is required between the TX bands within the same combiner/splitter. For TX bands will the filter unit 28 or 29 act as a combiner and TMA 26 or 27 as a splitter. Thanks to the band and sector assignment process the sectors S1, S2 and S3 in branch A are separated by guard bands provided by TX2, TX4 and TX6. Refer to the upper portion of the right hand portion of FIG. 5. In a corresponding manner will the bands TX1, TX3 and TX5 act as guard bands between the TX bands (TX2, TX4 and TX6) of the sectors in the B branch.

The requirements on the RX1, RX3 and RX5 filters in the A branch are that each RX filter shall prevent noise from leaking over to the other RX filters (inter channel noise). If this requirement is fulfilled no noise addition takes place.

A third advantage with the embodiment is that less connectors are needed. This reduces the costs of a TMA.

Figure 7:
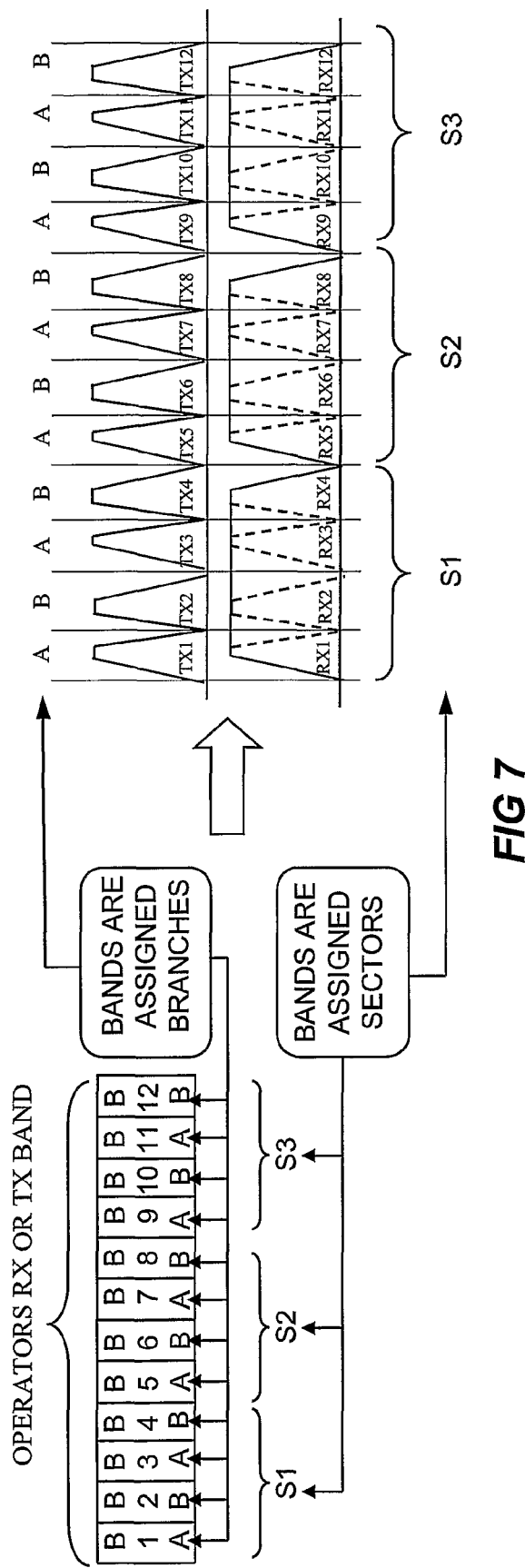
FIG. 7 illustrates a frequency diagram and modified assignment process for use with a radio base station in accordance with a second and third non-limiting, example embodiment.

FIG. 7 is a view similar to FIG. 5. In FIG. 7 the operator's band is divided into 12 sub bands B1-B12. Four transceivers (TRX) in the RBS are assigned one sub-frequency band B, that is one sector. Sub bands B1-B4 are assigned sector S1, sub bands B5-B8 are assigned sector S2 and B9-B12 are assigned sector S3.

Following a similar branch and sector assignment process as described in connection with FIG. 7 each branch and each sector is assigned two TX bands. As a result of the assignment process branch A in sector S1 is assigned TX frequencies within the TX bands TX1 and TX3, branch A in S2 is assigned TX5 and TX7 and branch A in S3 is assigned TX9 and TX11. In order to provide for diversity in the uplink the signals received in branch A of a sector, for example S1, must be the same as those received in branch B of the same sector. Following a similar reasoning as given in connection with FIG. 5 it appears that branch A in addition to its "own" RX frequencies RX1 and RX3 (that is the RX frequencies associated with the TX frequencies TX1 and TX3) must receive the RX frequencies in branch B of the same sector S1. These latter RX frequencies are RX2 and RX4. Therefore branch A has to receive signals within the bands RX1+RX2+RX3+RX4. Likewise branch B in sector S1 has to receive signals within the bands RX1+RX2+RX3+RX4. This combined RX band is illustrated with solid lines in FIG. 7 in its right lower portion. The dashed lines illustrate individual RX bands which in a mobile radio system are associated with corresponding individual TX frequencies. The result of the assignment process is illustrated in FIGS. 8-11.

Figure 9:
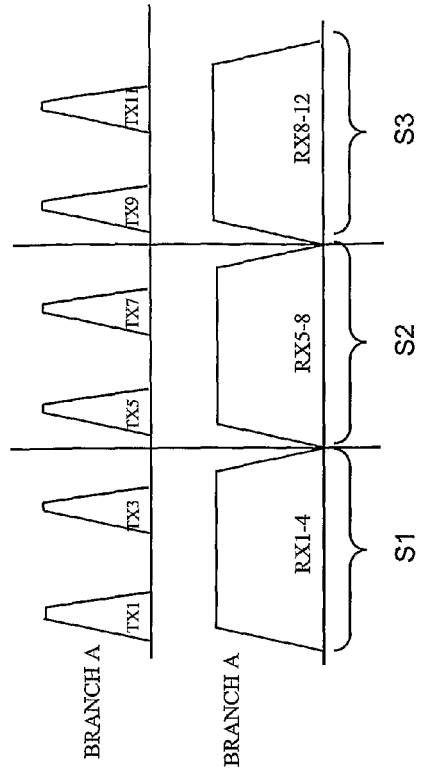
FIG. 9 illustrates the TX and RX frequency bands in branch A of FIG. 8.
Figure 11:
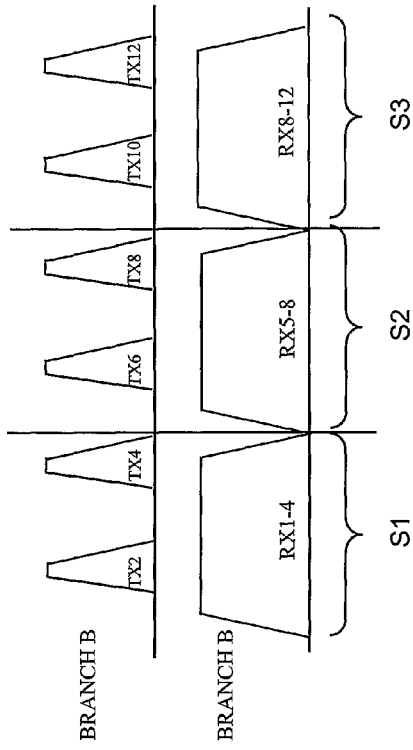
FIG. 11 illustrates the TX and RX frequency bands in branch B of FIG. 10
Figure 8:
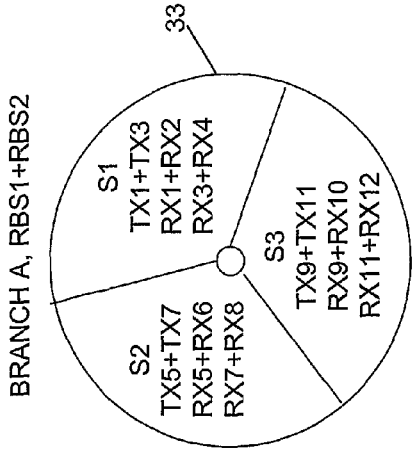
FIG. 8 illustrates branch A of a diversity antenna combination having three sectors, each sector having inscribed therein the TX and RX frequency bands resulting from the assignment process applied in connection with the second embodiment of the radio base station site.
Figure 10:
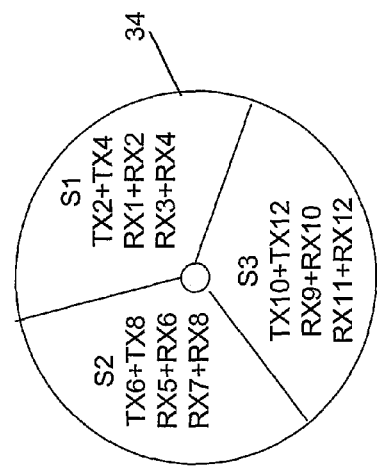
FIG. 10 illustrates branch B of the antenna combination referred to in connection with FIG. 8, the respective sectors having inscribed therein the TX and RX frequency bands resulting from the assignment process applied in connection with the second embodiment of the radio base station site.

FIG. 8 illustrates branch A of a logic antenna 33 with three sectors S1-S3 and FIG. 10 illustrates branch B of a similar logic antenna 34 with three sectors S1-S3. The TX and RX bands that as result of the assignment process of FIG. 7 have assigned to the respective sectors of the logical antennas appear in the respective sectors. FIG. 9 is associated with FIG. 8 and illustrates in diagram form the TX and RX frequencies assigned to the respective sectors in branch A. FIG. 11 is associated with FIG. 10 and illustrates in diagram form the TX and RX frequencies assigned to the respective sectors in branch B. The TX frequencies in branch B (i.e.TX2, TX4, TX6 . . . TX12) serve as guard bands between the TX frequencies of branch A and vice versa. Therefore the isolation requirement is fulfilled also with this assignment process.

Figure 12:
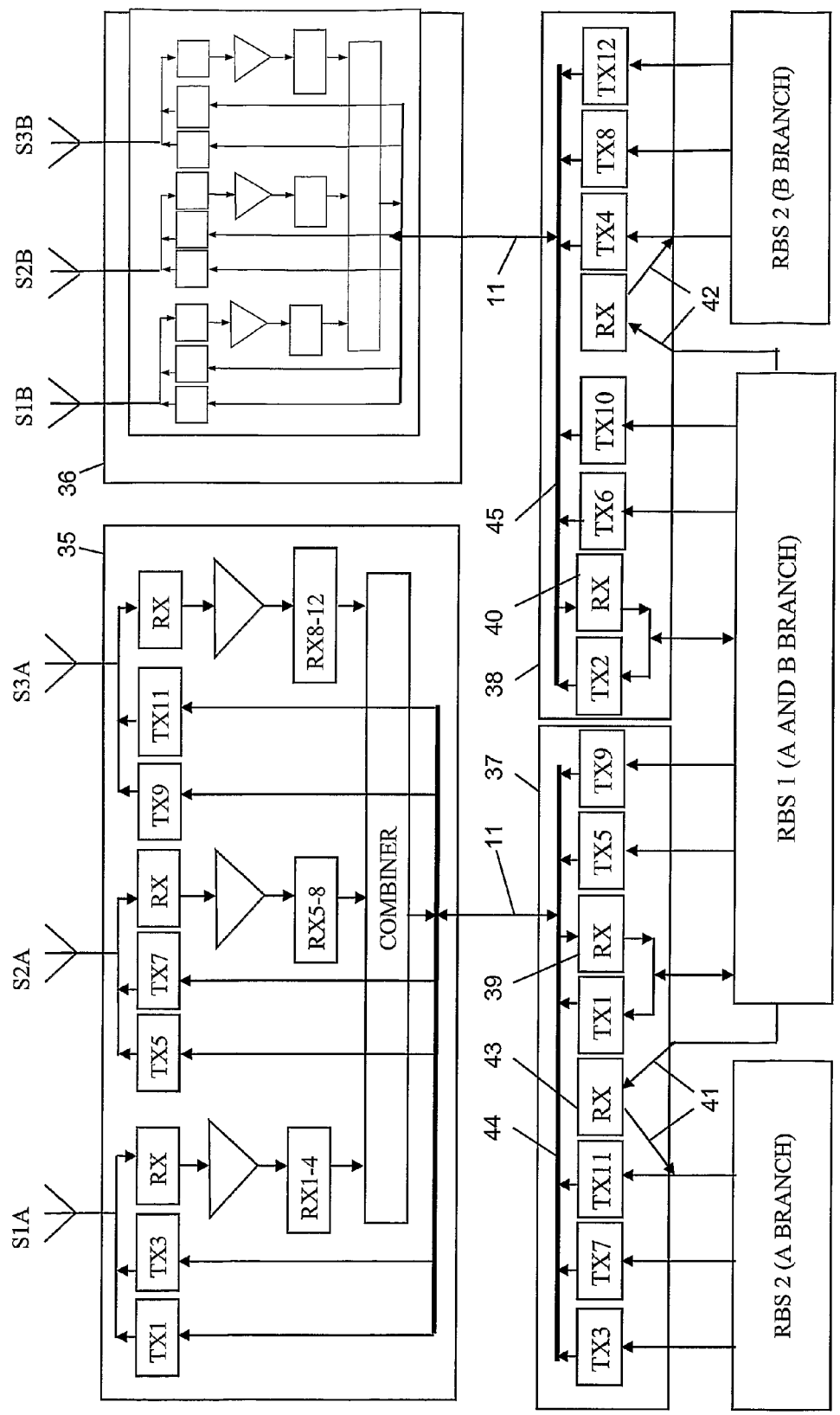
FIG. 12 is a block diagram of a second non-limiting, example embodiment of a radio base station site with two radio base stations.

In FIG. 12 a second embodiment is shown. The embodiment is related to the assignment process described in FIGS. 7-11 in which the sectors of a branch are assigned two TX frequency bands. In accordance with the second embodiment one of the two TX bands in all branches and sectors is assigned to a first RBS, labelled RBS1 and the other of the two is assigned to a second RBS, labelled RBS2. Two base stations will thus share the same antenna arrangement. This is advantageous in the case two different radio mobile systems, both using a frequency division system, are used in the same geographical area. For example RBS1 may serve a GSM system while RBS2 may serve a DAMPS or a TDMA system. The main advantage with this embodiment is that only two feeders 11 are required. This should be compared with the prior art case shown in FIG. 4 which, if applied on two radio base stations, would require twelve feeders.

The second embodiment comprises two TMAs 35 and 36. TMA 35 has a construction of the same general kind as TMA 26 in FIG. 6 in that it comprises a plurality of diplexed TX filters connected to a rail 31 and a plurality of full band RX filters connected to a combiner via a respective RF amplifier and narrow combined RX filters. The differences over FIG. 6 are that each sector has an additional TX filter for the additional RBS station and that the combined RX filters in each sector shall pass the RX signals of the additional RBS station. The filters in each of the sectors of branch A are indicated in FIG. 8 and in branch A they are connected in the manner shown in TMA 35. The filters in each of the sectors of branch B are indicated at an reduced scale in FIG. 10 and are connected in a similar manner shown in TMA 36 in which there is no room for reference designations. In each TMA the TX signals are splitted.

Two separate filters TX1 and TX3 in TMA 35 may be replaced with a single TX filter passing TX1, TX2 and TX3. This is likely to reduce costs.

Refer to sector S1. A guard band to the following sector's (S2) filters TX5, TX7 is required and such a guard band is provided by the TX4 band. Similarly the TX8 band serves as a guard band between S2's bands TX5, TX7 and the next sector's (S3's) filters TX9, TX11.

The combined RX signals from TMA 35 are fed to a filter unit 37 via a single feeder 11. The combined RX signals from a TMA 36 are fed to a filter unit 38 via another single feeder 11. The A and B branches pertaining to RBS1 use TX filters in both filter units 37, 38. Branch A pertaining to RBS2 uses filters in filter unit 37 while branch B pertaining to RBS2 uses filters in filter unit 38.

The RX combined signals from TMA 35 are fed to a RX filter 39 of duplex filter TX1-RX in filter unit 37 and from there to the TRXes in RBS1 which process the RX signals of the A and B branches. The RX filter should pass at least the RX1, RX2 . . . to RX12 frequencies. The combined signals from TMA 36 are fed to a RX filter 40 of a duplex filter TX2-RX in filter unit 38 and from there to the TRXes in RBS1 which process the RX signals of the A and B branches. The RX filter should pass at least the RX1, RX2 . . . to RX12 frequencies. A small portion of the RX signals passed by RX filter 39 is transferred to the TRXes in RBS2 which process the RX signals in the A branch via a direct connection illustrated by arrows 41. This is so, because it is not possible to connect full band RX filter 43 to rail 44 to which the RX filter 43 and the TX filters TX3, TX7, TX11, TX5, TX1, TX5 and TX9 are connected. Only one RX filter on the same frequency band can be connected to the rail; if more RX filters on the same frequency band are connected this would result in a signal loss. For the same reason a small portion of the RX signals passed by RX filter 40 are transferred to the TRXes in RBS2 which process the branch B signals. This is illustrated by arrows 42. The RX filter 40 is connected to a rail 45 and its received signals are transferred from RBS1 to RBS2 via a direct connection illustrated by arrows 42.

In the embodiment shown in FIG. 12 synth hopping may be implemented within the respective TX bands TX1-TX12.

Figure 13:
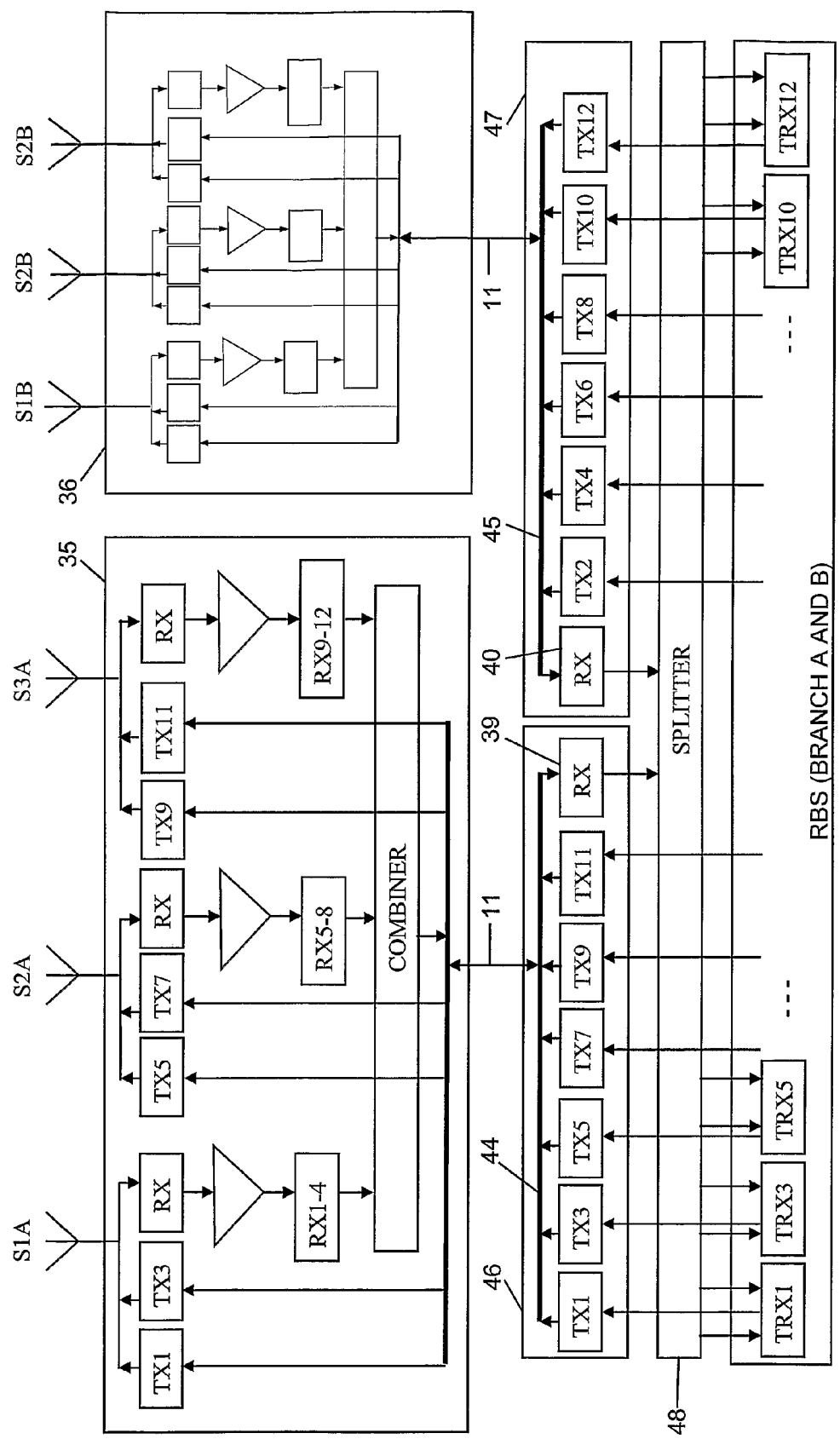
FIG. 13 is a block diagram of a third non-limiting, example embodiment of a radio base station site.

A third embodiment is shown in FIG. 13 in which the frequency assignment is the same as that shown in FIGS. 7-11. The third embodiment comprises two TMAs 35, 36, two feeders 11, two filter units 46, 47, a splitter 48, and one RBS. The TMAs are the same as those in the second embodiment. This third embodiment uses a feature that many existing radio base station transceivers exhibit. The feature referred to concerns hybrid combined pairs of transceivers (TRX). Two TRXes are connected to a respective input of a hybrid combiner the output of which is connected to a filter unit from which the TX signals from both of the two TRXes are fed to the feeder. A TX signal that passes the hybrid combiner is attenuated by 3 dB. If the combination of TRXes are made by a filter combination like 46, 47 in FIG. 13 the output power will be 3 dB higher since there are no hybrid combiner losses. The third embodiment is described with reference to an already existing radio base station provided with six pairs of hybrid combiners, and filter units in which the hybrid combiners are omitted or overridden, thus providing twelve individual TRXes.

These TRXes are assigned a respective TX band TX1-TX12 as described in connection with FIG. 7 and the TX signals from the individual TRXes will pass a respective TX filter in filter units 46 and 47 as illustrated. Filter unit 46 belongs to branch A and filter unit 47 to branch B. TX signals from filter unit 46 are fed via the left hand feeder 11 to the TMA 35 wherein they are split before transmission. Similarly TX signals from filter unit 47 are fed via the right hand feeder 11 to the TMA 36 where they are split and transmitted.

The combined RX signals fed from TMA 35 to the RBS via the feeder 11 passes the RX filter 39 in filter unit 46 and is subjected to splitting in splitter 48. The resulting split RX signals are fed to each one of the twelve TRXes TRX1-TRX12. Similarly the combined RX signals from TMA 36 is fed to filter unit 47 and from there to the splitter 48 where they are subjected to splitting. The resulting split signals are fed to each one of the twelve TRXes TRX1-TRX12. In this manner each transceiver receives the RX signals from the A and B branches and can perform diversity processing.

With this third embodiment synth hopping may take place within each assigned TX band and also between the TX bands of an individual sector; the latter frequency hopping is referred to as base band hopping. It is obvious that base band hopping in sector S1 can take place between TX1 and TX3. Less obvious is that it can also take place in the same sector S1 in the other branch B. This is so because a mobile within this sector is reachable from branch A as well as from branch B. In particular base band hopping in sector S1 may take place between TX1, TX3, TX2 and TX4. In sector S2 base band hopping may take place between TX5, TX7, TX6 and TX8. In sector S3 it may take place between TX9, TX11, TX 10 and TX12.

Figure 14:
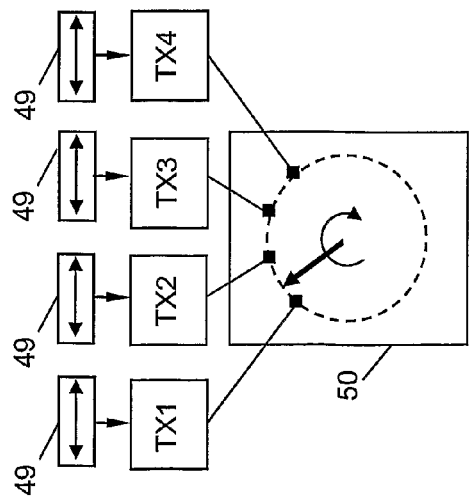
FIG. 14 is a block diagram of a device for frequency synth hopping and base band hopping.

The means by which synth hopping and base band hopping are realized in sector S1 are shown in the schematic block diagram in FIG. 14. A synth hopper for each base band is shown at 49 and a base band hopper is shown at 50. Synth hopping and base band hopping takes place at the same time and preferably randomly both within a band and between bands. For sector S2 a similar hopper devices 49 provide hopping within each of the bands TX5-TX8 and a similar base band hopper provides hopping between the bands TX5-TX8. For sector S3 a similar hopper devices 49 provide hopping within each of the bands TX9-TX12 and a similar base band hopper provides hopping between the bands TX9-TX12. The devices 49 and 50 are all located within the RBS.

The main advantage with frequency hopping is to reduce the effects of a noisy channel. By transmitting for a short periods in the channels, the effects of a single noisy channel will be repaired. In a GSM system synth hopping may take place in the transceiver by hopping between the various 200 kHz channels while base band hopping may take place by hopping between the transceivers.

It is thus possible to provide for synth hopping and base band hopping with the existing hardware in to day's radio base station. As far as applicant knows this is a novel feature and this novel feature makes the antenna arrangement more usable since hopping can take place among more frequencies.

As a modification, the combiners 30 in TMAs 26, 27 and also in TMAs 35, 36 may be omitted. The RX signals from the respective full band RX filters in each sector are fed directly to the rail 31.

The reason why combiners are used will be explained with reference to FIG. 6. If no combiners are used the RX signal at the output of the RX1,2 filter will leak over to the RX3,4 filter via the rail 31. A combiner acts as a hybrid or insulator that attenuates the RX signal by 3 dB. The use of LNAs connected before the combiners will, however, outweigh this otherwise serious attenuation of the RX signal.

Figure 15:
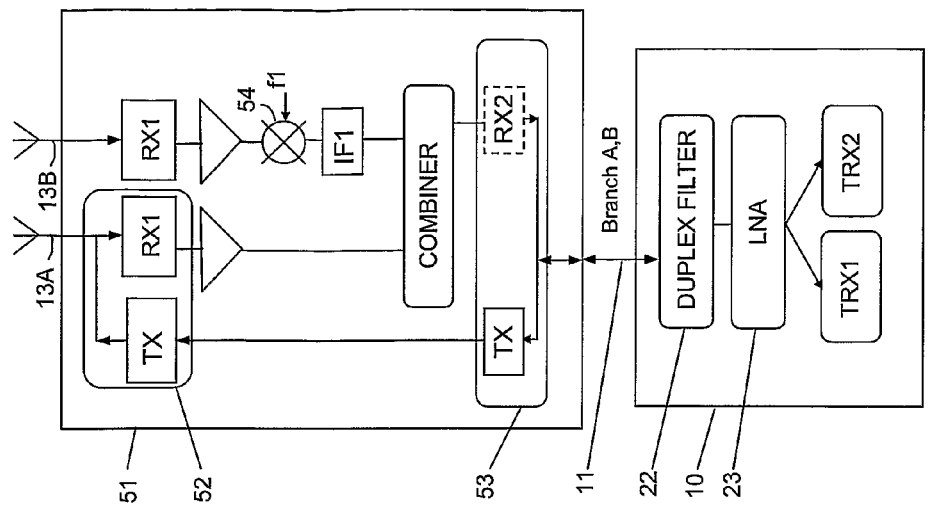
FIG. 15 is a block diagram of a non-limiting, example embodiment wherein received RX signals in one branch are frequency converted and fed together with RX signals received on the other branch on one single feeder to the radio base station.

In FIG. 15 an antenna diversity system according to commonly-assigned co-pending application PCT/SE04/00359, incorporated herein by reference, is shown. A TMA 51 comprises two diversity antennas 13A and 13B. Antenna 13A provides branch A and antenna 13B provide branch B. In the TX chain a duplex filter 52 comprising TX- and RX-filters is used. In the RX chains of branches A and B an RX filter RX1 is connected to the respective antennas. In branch B the RX1 filter is connected an RF amplifier whose output is connected to a mixer 54. In branch A the RX1 filter is connected to a combiner via a LNA. The RX signal from antenna 13B in branch B is frequency transformed to a frequency which falls outside the frequency range passed by the RX1 filters. In the combiner the RX signal in branch A is combined with the frequency transformed RX signal in branch B and is applied to a duplex filter 53 with a TX filter and a RX2 filter. A feeder 11 is connected to the duplex filter 53. Thanks to the frequency transformation it is possible to pass the diversity RX signals on branches A and B in one single feeder.

Figure 16:
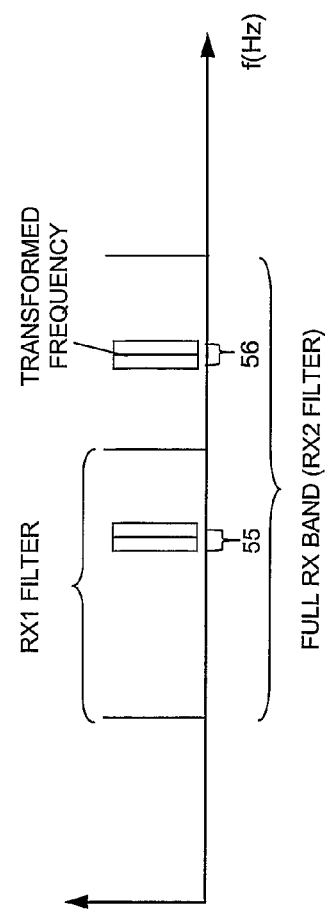
FIG. 16 is a frequency diagram illustrating the situation in FIG. 15.

In FIG. 16 the full frequency range assigned an operator is shown at bracket "Full RX Band". The full RX band is the range is passed by filter RX2. The frequency band occupied by user channels is shown at 55 and the frequency band which frequency converted RX signals occupy is shown at bracket 56.

Figure 17:
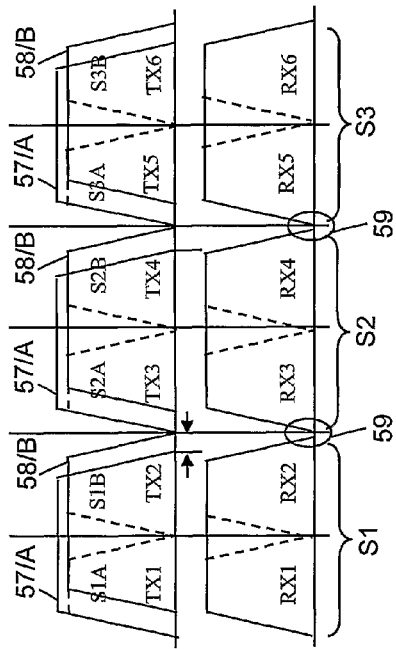
FIG. 17 is a frequency diagram showing the use of overlapping frequency bands.

In the previously described embodiments the TX frequency ranges assigned to the sectors S1-S3 of a branch (A or B) are non-overlapping. In FIG. 17 they are overlapping. Sector 1 in branch A is assigned TX frequency band 57, sector S2 in the same branch A is assigned an equal wide frequency range 57 and the same goes for sector 3 in branch A. Sector 1 in branch B is assigned another frequency band 58 which overlaps the frequency band 57 in the same sector in branch A. In doing so it is possible to provide for antenna hopping between branches A and B. Antenna hopping means that a signal on a fixed frequency is transmitted alternately on branches A and B. This will provide a kind of TX diversity. In a GSM system for example the broadcast control channel (BCCH) may be subjected to antenna hopping. Antenna hopping is realized by transmitting the fixed frequency signal on different TRXes in the RBS.

Using overlapping frequency bands 57, 58 will reduce the width of guard bands between the sectors of the same branch in comparison with the described first, second and third embodiments. In FIG. 17 a guard band between TX bands 57 in sector S1 and sector S2 has been indicated by the two small opposing arrows.

Figure 18:
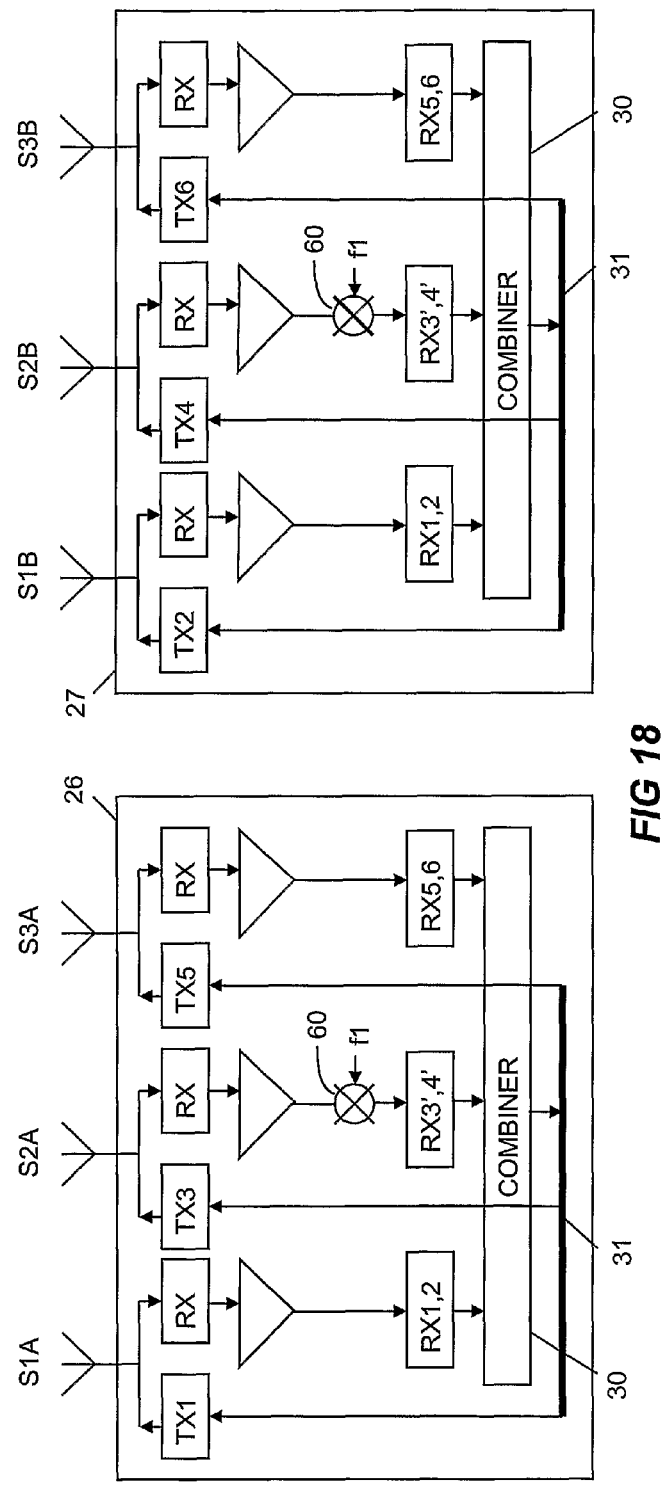
FIG. 18 is a block diagram of a three sector site with two feeders designed for use with overlapping frequency bands in accordance with FIG. 17.

Since RX filters, such as RX1+RX2, RX3+RX4 and RX5+RX6, are not steep enough there will be frequency ranges, marked with circles 59 in FIG. 17, wherein RX overlapping occurs between the filters. These areas of the frequency spectrum will be degraded because of noise addition from the other sectors. In order to provide a solution to this problem the frequency transformation technique described in connection with FIGS. 15 and 16 is used for the RX bands of sector S2 in the manner shown in FIG. 18 wherein a mixer 60 is inserted in the RX chain belonging to sector S2 in the A and B branches. The RX signal received on the antenna is mixed with a reference frequency f1 and the resulting frequency transformed RX signal at the output of the mixer is applied to an RX3'+RX4' frequency filter. The reference frequency f1 is selected so that the resulting frequency transformed RX signal will fall outside the RX1+RX2 and RX5+RX6 bands, either above these frequencies in the manner shown in FIG. 16 or below these. By frequency moving the RX3+RX4 band in this manner there will be no overlapping filter envelops in the areas 59 and therefore these areas will not be sensitive degraded.

In the embodiments described in FIG. 6 the full band RX filters in TMAs 26 and 27 may be replaced with band pass filters of the appropriate operating frequency. For example the RX filter in S1A may be replaced with a band pass filter RX1+RX2, the RX filter in S2A may be replaced with a band pass filter RX3+RX4 and the RX filter in S3A may be replaced with a band pass filter RX5+RX6. The same also applies for the embodiment shown in FIG. 18.

Similarly the full band RX filters in the TMAs 35 and 36 in FIGS. 12 and 13 may be replaced with band pass filters of the appropriate operating frequency. For example the RX filter in S1A may be replaced with a band pass filter RX1+RX2+RX3+RX4, the RX filter in S2A may be replaced with a band pass filter RX5+RX6+RX7+RX8 and the RX filter in S3A may be replaced with a band pass filter RX9+RX10+RX11+RX12.

Figure 19:
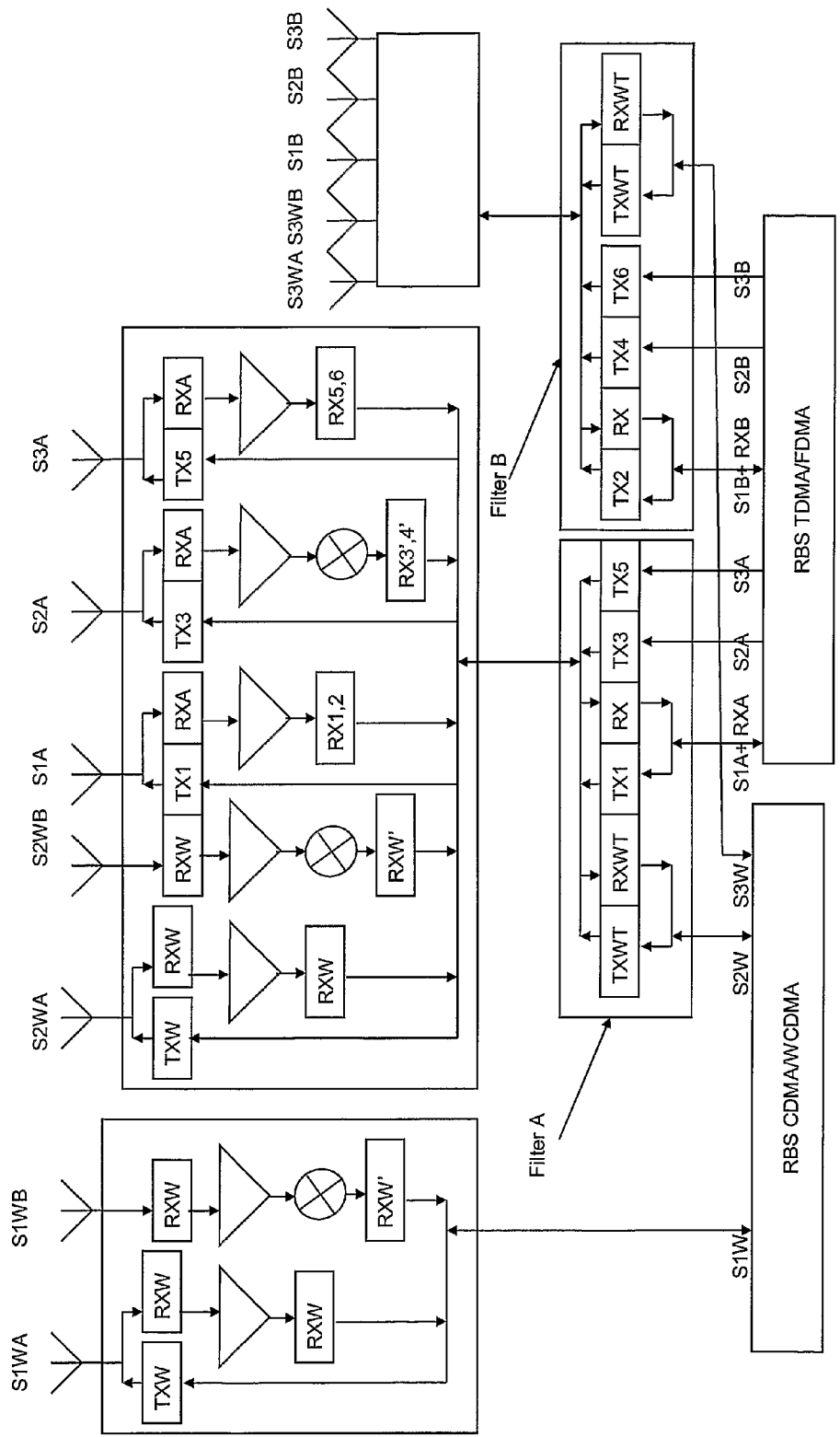
FIG. 19 is a block diagram of a three sector site with three feeders for a TDMA or FDMA radio base station co-sited with a CDMA or WCDMA radio base station.

FIG. 19 is disclosing a three sector site with three feeders for a TDMA (time division multiple access) or FDMA (frequency division multiple access) radio base station co-sited with a CDMA (code division multiple access) or WCDMA (wideband code division multiple access) radio base station. The arrangement is a combination with the teachings of our copending application PCT/SE04/00359. When the TDMA/FDMA system and the CDMA/WCDMA system are on different frequency bands, for example 900 MHz and 2100 MHz, the frequencies are distributed as shown in FIG. 21.

As seen in FIG. 20 all RX bands fall within same sub band and all TX bands fall within another same sub band irrespective of be it TDMA, FDMA, CDMA or WCDMA. Accordingly the bands assigned to the different operators are interleaved.

In the case shown in FIG. 21 the TX and RX bands pertaining to TDMA or FDMA will both fall within all of one operator's assigned frequency band, in the example the 900 MHz band, and so to say go together. The TX and RX bands pertaining to CDMA or WCDMA will also fall within all of another operator's assigned frequency band, in the example the 2100 MHz band, and belong together.

Refer to FIG. 19. The embodiment shown therein covers the two cases shown in FIGS. 20 and 21. The TX1, TX2 and TX3 bands belongs to TDMA/FDMA and are transmitted on sector 1 branch A (S1A), S2A and S3A respectively. WCDMA transmission takes place on two branches A and B. In CDMA/WCDMA transmission to and reception from a mobile unit utilise the same frequency range of the operator's assigned RX and TX bands in all sectors. Therefore no frequency division like the one used for a TDMA/FDMA system as shown in FIG. 5 can be used. In CDMA/WCDMA one, branch B, of the two branches is frequency converted and the resulting RXW' signal is fed from the leftmost TMA in FIG. 19 to the CDMA/WCDMA RBS on a single feeder. In FIG. 20 (where W stands for CDMA/WCDMA) the frequency converted RXW signals are shown at the middle portion of the frequency diagram. The operator normally has a small portion of the available band. Since the RBS can receive in the full band assigned a standard there is a possibility to move one RX branch to another, not used, part of the full band using frequency conversion. Since all signals to and from the TMA are on different frequencies they can be fed on the same feeder.

Figure 22:
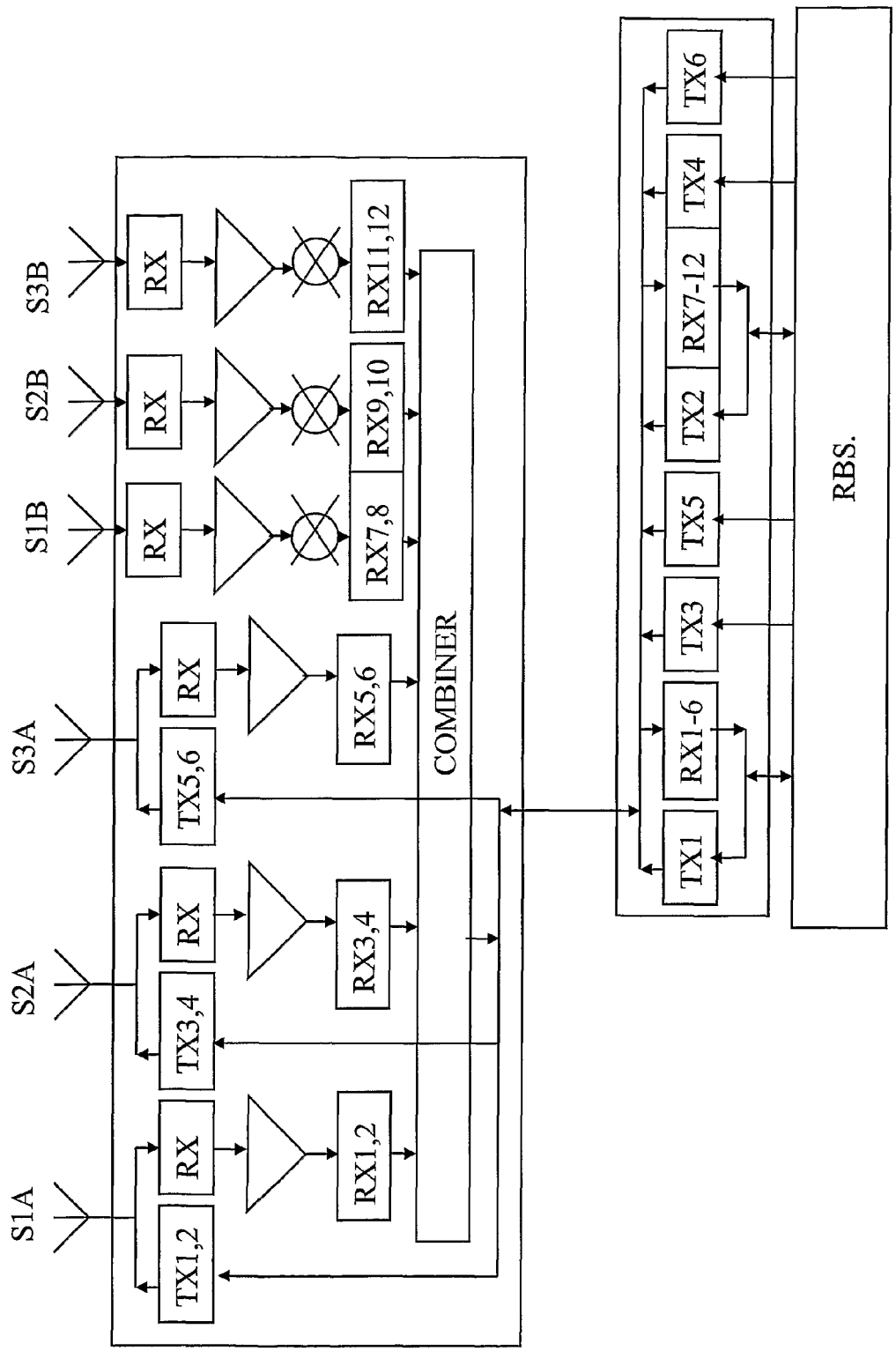
FIG. 22 is a block diagram of a three sector site with one feeder.

In FIG. 22 a three sector site with one feeder for a TDMA or a FDMA system is shown. The arrangement is a combination of the teachings with the teachings of our copending application PCT/SE04/00359. The band division and the branch and sector assignments are similar to those shown in FIG. 5, although all transmitting occurs on one branch only, the A branch. TX1 has been consolidated with TX2, TX3 with TX4, and TX5 with TX6. This means that TX1 for branch A is transmitting on the same antenna as TX2 of branch B and also that TX1 is transmitting in the same sector as TX2 implying that their respective transmissions cover the same area. The RX signals received on the B branch are mixed with respective reference frequencies in order to move the resulting frequency converted RX signals RX7-RX12 to another part of the operator's band. In the RBS the frequency moved RX signals are converted down to their original frequencies so as to provide for diversity processing. The main advantage with this embodiment is that just one feeder is needed.

Radio base station (RBS) sites with 2 sectors may occur. RBS sites with more than three sector antenna arrangements may also occur. The technology is not restricted to the three sector antenna arrangements shown.

Likewise diversity using more than two branches may occur and the technology is not restricted to a two antenna diversity arrangement.

The number of diversity branches may be increased to three or more by a corresponding division of the operator's assigned bands B. Refer to FIG. 5. If for example three branches A, B and C are used, then each sector could comprise three sub bands and there would be three sectors. Altogether the operator's band could be divided into 3×3=9 sub bands B1-B9. Sometimes an antenna arrangement comprises only two sectors. Refer to FIG. 5. In this case each sector would comprise two sub bands. The operator's assigned band would be sub-divided into only 2×2=4 sub bands B1-B4. Sometimes an antenna arrangement comprises more than three sectors. Refer to FIG. 5. If for example the antenna arrangement comprises 4 sectors and there are to branches A and B in each the operator's band would be sub divided into 4×2=8 sub bands B1-B8.

The invention claimed is:

1. A method for reducing the number of feeders between a radio base station and a diversity antenna system at a base station site of a frequency divided mobile cellular system with sectorized cells, the diversity antenna system comprising combinations of antennas for transmitting and receiving in a respective cell sector, each such antenna combination comprising at least two branches for providing diversity, an operator of said cellular system being assigned a predefined operator frequency band which in its turn is divided into a plurality of bands, each for transmitting and receiving, the method comprising:

assigning each sector one RX band and one TX band,
dividing the assigned TX bands into one or more sub bands so as to provide two or more diversity branches,
branch-wise diplexing the TX bands assigned to the sectors of a branch so that in each sector of a branch, signals are transmitted on the TX band assigned to this sector,
sector-wise combining signals received in a sector's own assigned RX band with signals received in the other sectors at the same branch, and
transmitting the diplexed TX signals and receiving the combined RX signals in all sectors of a branch on a single feeder.

2. A method in accordance with claim 1, further comprising: dividing said TX band into multiple TX sub-bands and dividing said RX band multiple RX sub-bands.

3. A method in accordance with claim 2, further comprising assigning some of the TX sub-bands and some of the RX sub-bands to a first radio base station and assigning others of the TX sub-bands and others of the RX sub-bands to a second radio base station.

4. A method in accordance with claim 2, wherein said TX sub-bands and RX sub-bands are associated with a single radio base station.

5. A method in accordance with claim 4, wherein a call with a mobile station present in a sector of the antenna system is subjected to a synthesizer frequency hopping within a TX frequency sub-band simultaneously as the cell is subjected to a base band frequency hopping among the TX frequency sub-bands assigned to this sector.

6. A method in accordance with claim 2, wherein first ones of the TX sub-bands assigned to the sectors of one branch are spaced apart in frequency by second ones of the TX sub-bands assigned to the corresponding sectors of another branch, the second TX sub-bands thereby acting as guard bands between the first TX sub-bands.

7. A method in accordance with claim 1, wherein each diplexed TX signal is filtered in an individual TX filter.

8. A method in accordance with claim 1, wherein the sector-wise combined RX signals of a branch are filtered, at the site of the antenna arrangement, in individual band pass filters, the band pass filter of an individual sector passing the RX frequency band assigned to this sector plus the RX frequency bands assigned to the same sector in the other branches.

9. An antenna diversity arrangement for a radio base station of a frequency divided mobile cellular system with sectorized cells, the antenna diversity arrangement comprising:
   combinations of antennas for transmitting and receiving in a respective cell sector, each such antenna combination comprising at least two branches for providing diversity, an operator of said cellular system being assigned a predefined operator frequency band which in its turn is divided into a plurality of bands for transmitting and receiving, each sector being assigned one RX band and one TX band;
   multiple TX-filters in each diversity branch, each of the TX-filters corresponding to a respective TX band and a respective sector;
   multiple RX-filters in each diversity branch, each of the RX-filters coupled to a respective low noise amplifier corresponding to a respective sector;
   a tower mounted amplifier provided for each branch, the tower-mounted amplifier for an individual branch including: a splitter for splitting TX signals and sending the split TX signals to the multiple TX-filters corresponding to the sectors of said branch, and a combiner for combining the signals received in a sector's assigned RX band with signals received in the other sectors at the same branch; and
   a single feeder connected to a respective tower-mounted amplifier for transmission of all TX and RX signals of the branch to which the tower-mounted amplifier belongs.

10. An antenna diversity arrangement in accordance with claim 9, wherein in addition to said one TX band and one RX band, each sector in each branch is assigned one or more further TX bands and one or more further RX bands, and wherein each sector of a branch is provided with one or more further TX filters and one or more further RX filters passing the one or more further RX bands.

11. An antenna diversity arrangement in accordance with claim 10, wherein said one TX filter and said one or more further TX filters are consolidated into one single TX filter passing the respective frequencies associated with the various TX filters.

12. An antenna diversity arrangement in accordance with claim 10, wherein said one or more further TX filters and said one or more further RX filters are associated with a respective individual radio base station.

13. An antenna diversity arrangement in accordance with claim 9, wherein the TX filters associated with the sectors of one branch are spaced apart in frequency by the TX bands of the TX filters associated with the corresponding sectors of another branch, the latter TX bands thus acting as guard bands between the TX frequencies of the TX filters associated with the sectors of said one branch.

14. An antenna diversity arrangement in accordance with claim 9, wherein the combiner and splitter are an integrated unit in the form of a rail which is connected to the feeder.

15. An antenna diversity arrangement in accordance with claim 9, wherein the combiner is a separate unit to which RX signals received in all of the sectors of a tower mounted amplifier are fed via respective RF amplifiers and RX filters, the combiner being connected to a rail, and the rail being connected to the single feeder of the tower mounted amplifier.

16. A radio base station system at a base station site with sectorized cells for use in a frequency divided mobile cellular system, an operator of said cellular system assigned a predefined operator frequency band which in its turn is divided into a plurality of bands, each for transmitting and receiving, the radio base station system comprising:
   a radio base station,
   a diversity antenna system, coupled to the radio base station, including combinations of antennas for transmitting and receiving in a respective cell sector, each such antenna combination comprising at least two branches for providing diversity,
   feeders extending between the diversity antenna system and the radio base station, each sector being assigned one TX band and one RX band,
   wherein each branch includes a tower mounted amplifier that includes:
      multiple TX filters and multiple RX filters, one TX filter and one RX for each one of the sectors,
      a splitter for splitting the respective TX bands assigned to the sectors of said branch, and
      a combiner for combining the signals received in a sector's assigned RX band with signals received in the other sectors at the same branch, and
   a single feeder connected to a respective tower mounted amplifier for transmission of all TX and RX signals of the branch to which the tower mounted amplifier belongs.

17. A radio base station in accordance with claim 16, wherein each sector is assigned one or more additional TX bands and one or more additional RX bands, each additional TX and RX band being associated with a respective additional radio base station, each RBS filter unit connected to the radio base station further comprising a TX filter for each further TX band, each additional RX band being associated with a respective additional band pass RX filter passing at least the operator's frequency band, the received RX signal in the feeder to which the RBS filter unit of a branch is connected first passing the band pass RX filter and from there into a duplex TX/RX filter, an amplifier and a coupler from which the RX signal is connected to the additional band pass RX filter the output of which is connected to the additional radio base station.

18. A radio base station in accordance with claim 16, further comprising means providing synthesizer frequency hopping within each assigned TX band and means providing base band frequency hopping among the TX frequencies assigned to an individual sector.

19. A radio base station system in accordance with claim 16, further comprising multiple radio base station (RBS) filter units, one RBS filter unit provided for each branch, the RBS filter units being connected to respective feeders as well as to transceivers provided in the radio base station, an RBS filter unit of a branch comprising a band pass RX filter passing at least the operator's frequency band and individual TX filters, each TX filter being associated with a respective sector of the branch to which the RBS filter unit belongs.

* * * * *